(12) United States Patent
Blomberg et al.

(10) Patent No.: US 10,816,385 B2
(45) Date of Patent: Oct. 27, 2020

(54) RADAR LEVEL GAUGE

(71) Applicant: Rosemount Tank Radar AB, Mölnlycke (SE)

(72) Inventors: Urban Blomberg, Linköping (SE); Håkan Delin, Linköping (SE); Lars-Ove Larsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 252 days.

(21) Appl. No.: 16/014,509

(22) Filed: Jun. 21, 2018

(65) Prior Publication Data

US 2019/0390997 A1 Dec. 26, 2019

(51) Int. Cl.
*G01F 23/284* (2006.01)
*G01S 7/35* (2006.01)

(52) U.S. Cl.
CPC ............ *G01F 23/284* (2013.01); *G01S 7/352* (2013.01); *G01S 2007/356* (2013.01)

(58) Field of Classification Search
CPC .... G01F 23/0069; G01F 23/284; G01S 13/88; G01S 2007/356; G01S 7/352
See application file for complete search history.

(56) References Cited

U.S. PATENT DOCUMENTS

| | | | |
|---|---|---|---|
| 5,734,347 A | 3/1998 | McEligot | |
| 5,996,406 A | 12/1999 | Ward | |
| 6,107,957 A | 8/2000 | Cramer et al. | |
| 7,729,201 B2 | 6/2010 | Wildey | |
| 9,739,879 B2 | 8/2017 | Rohling | |
| 2016/0117426 A1* | 4/2016 | Savard | G01F 23/0069 703/2 |
| 2016/0131752 A1 | 5/2016 | Jansen et al. | |

OTHER PUBLICATIONS

Notification of Transmittal of the International Search Report and the Written Opinion of the International Searching Authority of PCT/EP2019/066319, dated Sep. 13, 2019.

* cited by examiner

*Primary Examiner* — Timothy A Brainard
(74) *Attorney, Agent, or Firm* — Westman, Champlin & Koehler, P.A.

(57) ABSTRACT

The present invention relates to a radar level gauge for determining a distance (D) to a surface of a product in a tank, said radar level gauge comprising: a transceiver configured to transmit an electromagnetic transmit signal ($S_T$) with varying frequency towards said surface and to receive an electromagnetic return signal ($S_R$), via a signal propagation device; a mixer adapted to mix the transmitted electromagnetic transmit signal with the received electromagnetic return signal to provide a mixer output signal including information about the surface's echo and information about another echo; and processing circuitry configured to apply an algorithm to the mixer output signal, which algorithm provides a distance-level rate matrix wherein the surface's echo and said another echo each is determined in the two dimensions distance and level rate, and to determine the distance to the surface based on the thus determined echo of the surface.

18 Claims, 8 Drawing Sheets

RADAR LEVEL GAUGE

FIELD OF THE INVENTION

The present invention relates to a radar level gauge and method for determining a distance to a surface of a product in a tank. The present invention also relates to a system comprising such a radar level gauge, to a computer program product, to a computer-readable storage medium, and to an electric signal.

BACKGROUND OF THE INVENTION

Since the radar level gauging was developed as a commercial product in the 1970's and 1980's, Frequency Modulated Continuous Wave (FMCW) has been the dominating measuring principle for high accuracy applications. An FMCW measurement comprises transmitting into the tank a signal which is swept over a frequency range in the order of a few GHz. For example, the signal can be in the range 24-27 GHz, or 9-11 GHz. The transmitted signal is reflected by the surface of the product in the tank (or by any other impedance transition) and an echo signal, which has been delayed a certain time, is returned to the gauge. The echo signal is mixed with the transmitted signal to generate a mixer (output) signal, having a frequency equal to the frequency change of the transmitted signal that has taken place during the time delay. Due to the linear sweep, this difference frequency, also referred to as an intermediate frequency (IF), is proportional to the distance to the reflecting surface. The mixer signal is often referred to as an IF signal.

However, it may not be possible to track echoes being close to each other since they are not resolved as two echoes. This may for example apply to a moving surface passing a disturbance in the tank.

Also, there may be measurement errors for two echoes being close to each other because of interference, e.g. if the surface is close to the bottom of the tank.

General Disclosure of the Invention

It is an object of the present invention to mitigate the above problems, and to provide an improved radar level gauge and method.

According to a first aspect of the present invention, this and other objects are achieved by a radar level gauge for determining a distance to a surface of a product in a tank, said radar level gauge comprising: a transceiver configured to transmit an electromagnetic transmit signal with varying frequency towards said surface and to receive an electromagnetic return signal, via a signal propagation device; a mixer adapted to mix the transmitted electromagnetic transmit signal with the received electromagnetic return signal to provide a mixer output signal including information about the surface's echo and information about another echo; and processing circuitry configured to apply an algorithm to the mixer output signal, which algorithm provides a distance-level rate matrix wherein the surface's echo and said another echo each is determined in the two dimensions distance and level rate, and to determine the distance to the surface based on the thus determined echo of the surface.

The present invention is based on the understanding that echoes being close to each other in radar level gauging may be resolved (i.e. discriminated or separated) by applying an algorithm, for example a so-called range Doppler algorithm, wherein except the distance also the level rate (e.g. mm/sweep) of the two echoes is determined. This provides for improved measurement accuracy for echoes at the same distance and for improved resolution for two echoes being close to each other.

Said surface may be moving, wherein said another echo comes from an element in or of said tank, which element is stationary or moving at a different level rate than the moving surface, and wherein the processing circuitry in applying the algorithm is configured to resolve the moving surface's echo and said element's echo (as two separate echoes). Even if the element is stationary, it may be perceived as moving in the opposite direction compared to the surface, when the element is below the moving surface, because the electromagnetic signals have different speeds in different media. This makes it technically advantageous to apply the aforementioned algorithm to a radar level gauge, because the opposite directions resulting in opposite level rates increase the separation of the echoes.

The element may for example be a disturbance in said tank, wherein the processing circuitry in applying the algorithm is configured to resolve the moving surface's echo and the disturbance's echo while the moving surface passes the disturbance in said tank. In this way improved tracking capabilities may be achieved, as the surface may be resolved and tracked when passing the disturbance having a different level rate. Also, the measurement accuracy when the surface is close to the disturbance may be improved, since the surface echo and disturbance echo are separated. The disturbance may for example be a beam inside the tank.

In another example, the element is the bottom of said tank. Here, the measurement accuracy when the (moving) surface is close to the (stationary) bottom may be improved.

The electromagnetic transmit signal may comprise a plurality of frequency sweeps. The electromagnetic transmit signal may for example be sawtooth-shaped (up-chirp). The electromagnetic transmit signal can be in the range 24-27 GHz or 9-11 GHz, for example.

There may be a delay after each frequency sweep of said plurality of frequency sweeps. This may improve the resolution, without having to increase the number of frequency sweeps per unit of time. The latter may save processing power, which is particularly advantageous in a radar level gauge which typically has a limited current supply (e.g. 4-20 mA). It may also require less memory. The delay may for example be in the range of 0.5-1.5 s, such as 1 s.

The processing circuitry may be configured to apply the algorithm to the mixer output signal by: performing a first Fast Fourier Transform on the mixer output signal for each of at least some frequency sweeps of the plurality of frequency sweeps of the electromagnetic transmit signal; storing the resulting spectra in a distance-time matrix; and performing a second Fast Fourier Transform for each distance in the distance-time matrix giving the distance-level rate matrix in which the surface's echo and said another echo each is determined in the two dimensions. The distance-level rate matrix may for example be based on 32 sweeps. Furthermore, each distance may be a distance bin. The bin may for example be 25 mm. Instead of two (1D) FFTs, one 2D FFT could be performed. Also, instead of FFT, DFT (discrete Fourier transform) or the Goertzel algorithm could be used, for example.

As indicated above, the algorithm may be a range Doppler algorithm.

The radar level gauge may be a Frequency Modulated Continuous Wave radar level gauge (non-contacting or GWR (guided wave radar)).

According to a second aspect of the present invention, there is provided a system, comprising: a tank; and a radar level gauge according to the first aspect.

According to a third aspect of the present invention, there is provided a method of determining a distance to a surface of a product in a tank, which method comprises: transmitting an electromagnetic transmit signal with varying frequency towards said surface; receiving an electromagnetic return signal; mixing the transmitted electromagnetic transmit signal with the received electromagnetic return signal to provide an output signal including information about the surface's echo and information about another echo; applying an algorithm to the output signal, which algorithm provides a distance-level rate matrix wherein the surface's echo and said another echo each is determined in the two dimensions distance and level rate; and determining the distance to the surface based on the thus determined echo of the surface. This aspect may exhibit the same or similar feature and technical effect as the first and/or second aspect, and vice versa.

Said surface may be moving, wherein said another echo comes from an element in or of said tank, which element is stationary or moving at a different level rate than the moving surface, and wherein applying the algorithm includes resolving the moving surface's echo and said element's echo.

Said element may be a disturbance in said tank, wherein applying the algorithm includes resolving the moving surface's echo and the disturbance's echo while the moving surface passes the disturbance in said tank.

Said element may be the bottom of said tank.

The electromagnetic transmit signal may comprise a plurality of frequency sweeps.

There may be a delay after each frequency sweep of said plurality of frequency sweeps.

Applying the algorithm to the output signal may comprise: performing a first Fast Fourier Transform on the output signal for each of at least some frequency sweeps of the plurality of frequency sweeps of the electromagnetic transmit signal; storing the resulting spectra in a distance-time matrix; and performing a second Fast Fourier Transform for each distance in the distance-time matrix giving the distance-level rate matrix in which the surface's echo and said another echo each is determined in the two dimensions.

The algorithm may be a range Doppler algorithm.

According to a fourth aspect of the present invention, there is provided a computer program product comprising computer program code to perform, when executed on a computer, the steps of: applying an algorithm to an output signal, which output signal is provided by mixing an electromagnetic transmit signal transmitted towards a surface of a product in a tank with a received electromagnetic return signal, wherein the output signal includes information about the surface's echo and information about another echo, wherein the algorithm provides a distance-level rate matrix wherein the surface's echo and said another echo each is determined in the two dimensions distance and level rate; and determining the distance to the surface based on the thus determined echo of the surface. This aspect may exhibit the same or similar feature and technical effect as one or more of the first to third aspects, and vice versa. The present computer program product could be added as a software upgrade to existing radar level gauges. The computer program product may be embodied on a computer-readable storage medium.

According to a fifth aspect of the present invention, there is provided a computer-readable storage medium comprising the computer program product according to the fourth aspect.

According to a sixth aspect of the present invention, there is provided an electrical signal embodied on a carrier wave and propagated on an electrical medium, the electrical signal comprising the computer program product according to the fourth aspect.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
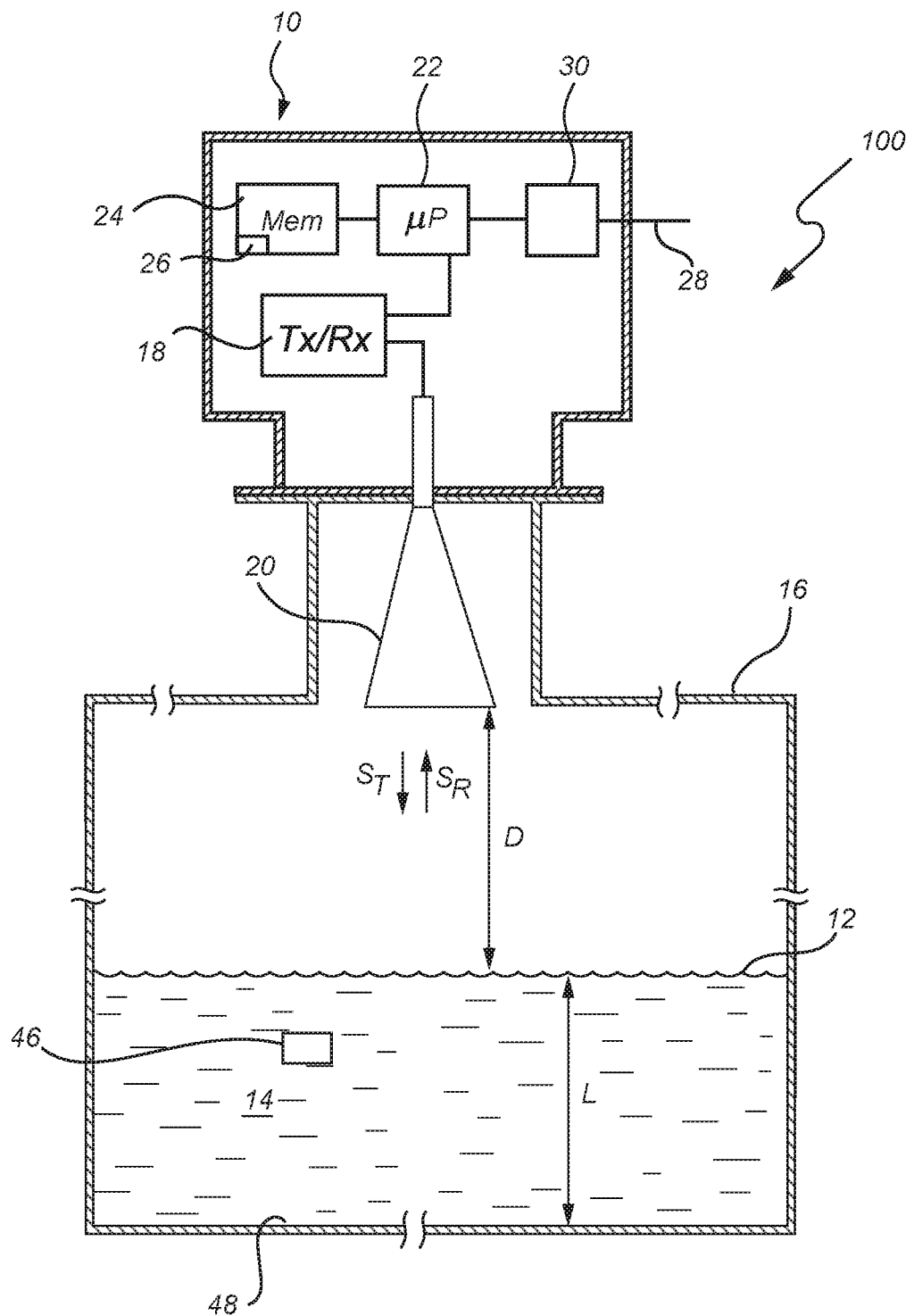
FIG. 1 is a schematic section view of a radar level gauge suitable for implementing the present invention.

FIG. 1 schematically illustrates a radar level gauge 10, according to an embodiment of the present invention, for determining a distance D from a reference position to a surface 12 of a product 14 in a tank 16. By determining the distance D, the filling level L can be deduced.

The radar level gauge 10 is an FMCW (Frequency Modulated Continuous Wave) radar level gauge. In particular, the illustrated radar level gauge 10 is a non-contacting FMCW radar level gauge. The radar level gauge 10 and the tank 16 may form part of a system 100.

The product 14, which in FIG. 1 partly fills the tank 16, may be a liquid, a liquid gas, or even a solid, such as grain or plastic pellets. It should be noted that, although a tank 16 comprising a single product 14 is described herein, the distance to any material interface present in the tank 16 can be determined in a similar manner.

The radar level gauge 10 may be arranged at the top of the tank 16. The radar level gauge 10 is typically stationary. The radar level gauge 10 is typically aimed in one direction (downwards). The radar level gauge 10 comprises a transceiver 18 configured to transmit an electromagnetic transmit signal $S_T$ with varying frequency towards the surface 12 and to receive an electromagnetic return signal $S_R$ traveling back from the surface 12, via a signal propagation device of the radar level gauge 10. Typically, the electromagnetic transmit signal $S_T$ and the electromagnetic return signal $S_R$ travel perpendicularly to the surface 12.

The signal propagation device is here an antenna 20 connected to the transceiver 18. The antenna 20 may be connected to the transceiver 18 via a wave guide. It is noted that the antenna 20 optionally may be connected directly to the transceiver 18, or be connected via a suitable signal medium, such as a coaxial cable. The antenna 20 may be a free propagating antenna for radiating and capturing electromagnetic signals. The antenna 20 may be a cone antenna or a rod antenna or a parabolic antenna, for example. The signal propagation device could alternatively be a probe (GWR).

The radar level gauge 10 further comprises processing circuitry 22 connected to transceiver 18. The processing circuitry 22 may generally be configured to control the transceiver 18, and to determine or deduce the filling level L based on signals from the transceiver 18. The processing circuitry 22 may for example be the ARM Cortex M4 processor.

The processing circuitry 22 may also be connected to a memory 24 of the radar level gauge 10, which memory 24 may store any software (computer program product) 26 required for the operation of the radar level gauge 10. The memory 24 may also provide RAM used during operation. The processing circuitry 22 may further be connected to external communication lines 28 for analog and/or digital communication via an interface 30 of the radar level gauge 10. As an example, communication between the interface 30 and an external control station (not shown) can be provided by a two-wire interface, which has a combined function of both transmitting a measurement result to the control station and receiving power for operation of the radar level gauge 10. Such a two-wire interface may provide a more or less constant power, and the measurement result can be superimposed on the power voltage using a digital protocol, such as Fieldbus Foundation or HART. Alternatively, the current in the external communication lines 28 is regulated in accordance with the prevailing measurement result. An example of such an interface is the 4-20 mA industrial loop, where the current is regulated between 4 and 20 mA, depending on the measurement result. Alternatively, the radar level gauge 10 may communicate wirelessly with the external control station using e.g. a Wireless HART protocol, and use a local power supply (not shown) with batteries or other means of scavenging energy for autonomous operation.

Figure 2:
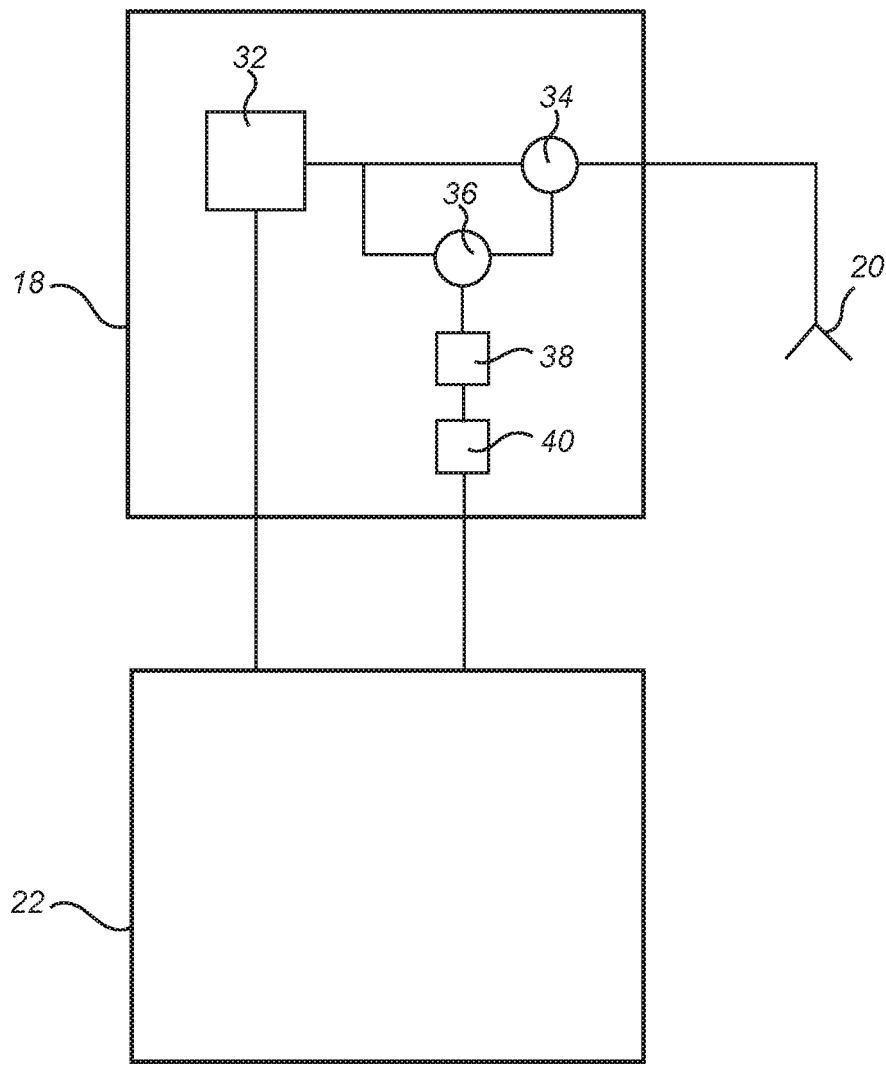
FIG. 2 is a schematic block diagram of a transceiver in the radar level gauge of FIG. 1 according to an embodiment of the present invention.

With further reference to FIG. 2, the transceiver 18 may include a microwave source 32. The microwave source 32 may generate the electromagnetic transmit signal $S_T$. The electromagnetic transmit signal $S_T$ can be in the range 24-27 GHz or 9-11 GHz, for example. For GWR, the electromagnetic transmit signal $S_T$ can be in the range 1-2 GHz. The microwave source 32 may be controlled by a timer or timing circuitry (not shown) of the processing circuitry 22. The microwave source 32 is connected to the antenna 20 via a power divider 34, and also to a mixer 36 (of the transceiver 18) of the radar level gauge 10. The power divider 34 is arranged to connect the electromagnetic return signal $S_R$ signal from the antenna 20 to the mixer 36, in order to allow the mixer 36 to mix the electromagnetic transmit signal $S_T$ from the microwave source 32 with the electromagnetic return signal $S_R$ and provide a (mixer) output signal, also referred to as intermediate frequency signal. The mixer 36 may further be connected to a band pass filter 38, which in turn may be to an amplifier 40.

While the elements of the transceiver 18 are typically implemented in hardware, and form part of an integrated unit normally referred to as a microwave unit, at least some portions of the processing circuitry 22 are typically embodied by software modules executed by an embedded processor. The invention is not restricted to this particular realization, and any implementation found suitable to realize the herein described functionality may be contemplated.

The output signal of the mixer 36 may include information about the echo of the surface 12 but also information about another echo. The another echo may come from an element, such as a disturbance 46 in the tank 16 or the bottom 48 of the tank 16. However, as indicated in the background section of the present application, with existing solutions it may not be possible to track echoes being close to each other since they are not resolved as two echoes. This may for example apply when the surface 12 is moving up/down and passes the disturbance 46, or when the moving surface 12 is close to the bottom 48 of the tank 16.

To this end, the present processing circuitry 22 may be configured to apply an algorithm, typically a range Doppler algorithm, to the mixer output signal so as to determine the aforementioned echoes for two dimensions (distance and level rate), and to determine the distance D to the surface 12 based on the thus determined echo of the surface 12. The dimension distance herein corresponds to the distance D (value).

Figure 3A:
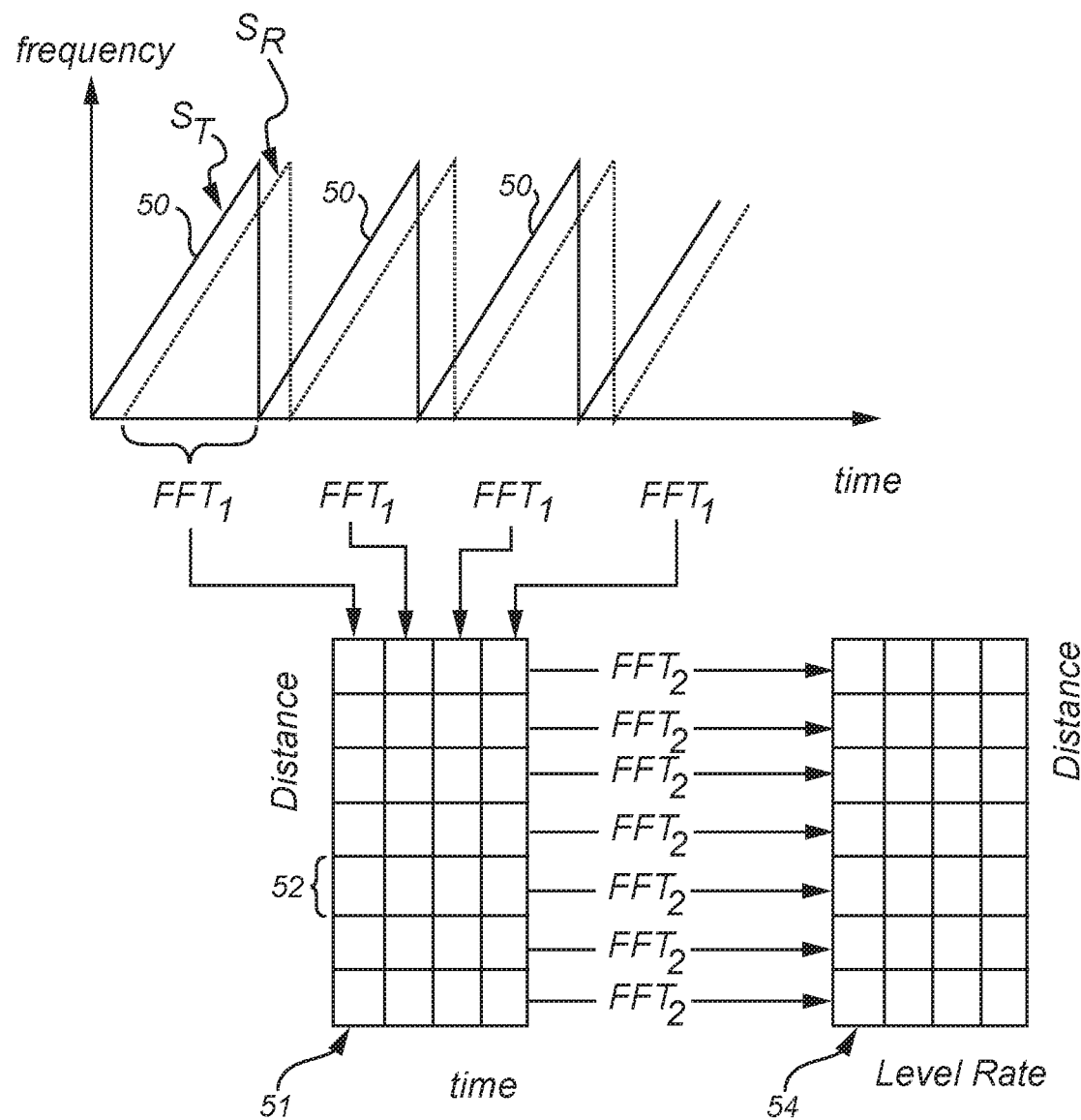
FIG. 3a shows an electromagnetic transmit signal, an electromagnetic return signal, a distance-time matrix, and a distance-level rate matrix according to an embodiment of the present invention.
Figure 3B:
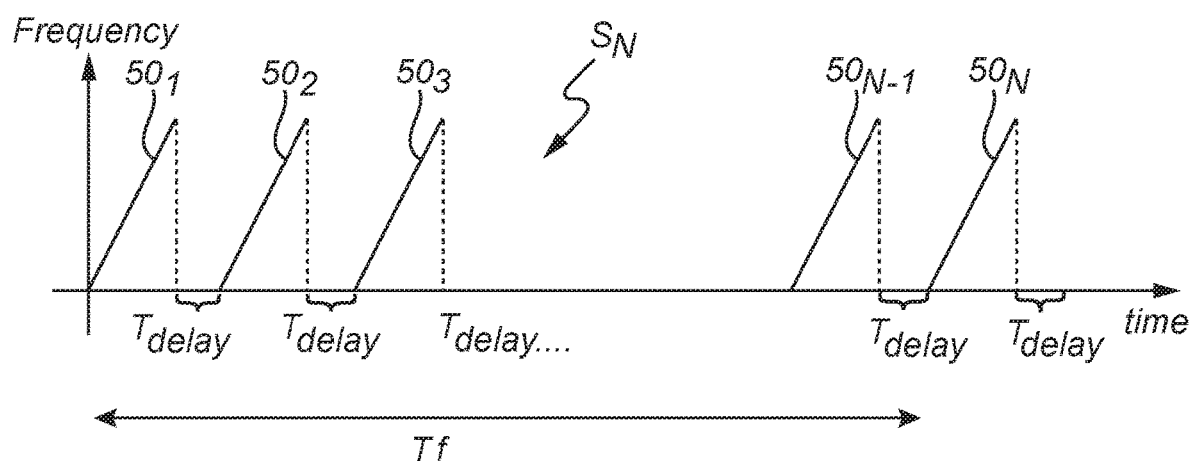
FIG. 3b shows an alternative electromagnetic transmit signal.

With further reference to FIGS. 3a-b, the electromagnetic transmit signal $S_T$ may comprise a plurality of identical frequency sweeps 50. The electromagnetic transmit signal may for example be sawtooth-shaped (up-chirp). Each frequency sweep 50 may for example have a length of 8 ms and a bandwidth at 3 GHz. In FIG. 3a, the frequency sweeps 50 occur immediately after each other. Alternatively, there may be a delay $T_{delay}$ after each frequency sweep 50, as shown in FIG. 3b. The delay $T_{delay}$ may for example be 1 s. The delay $T_{delay}$ may improve the resolution, so that the radar level gauge 10 can resolve echoes that are closely spaced in level rate, the because the delay $T_{delay}$ extends the total time Tf that the radar level gauge 10 looks at the surface 12 and element 46.

In applying the range Doppler algorithm to the mixer output signal, the processing circuitry 22 may perform a first Fast Fourier Transform $FFT_1$ on the mixer output signal for each frequency sweep 50 of the plurality of frequency sweeps 50 of the electromagnetic transmit signal $S_T$. Each FFT1 results in a spectrum. The processing circuitry 22 stores the resulting consecutive spectra in a distance-time matrix 51, wherein each distance may be a distance bin 52 of e.g. 25 mm. The 'distance' here is the distance D, and it could alternatively be called 'range'. Furthermore, the processing circuitry 22 performs a second Fast Fourier Transform $FFT_2$ for each distance (distance bin 52) in the distance-time matrix 51, giving a distance-level rate matrix 54 in which the surface's echo 56 and the aforementioned another echo 58 each is determined in the aforementioned two dimensions (distance and level rate), see also FIGS. 4a-b. The distance-level rate matrix 54 could alternatively be called a two-dimensional spectrum.

Figure 4A:
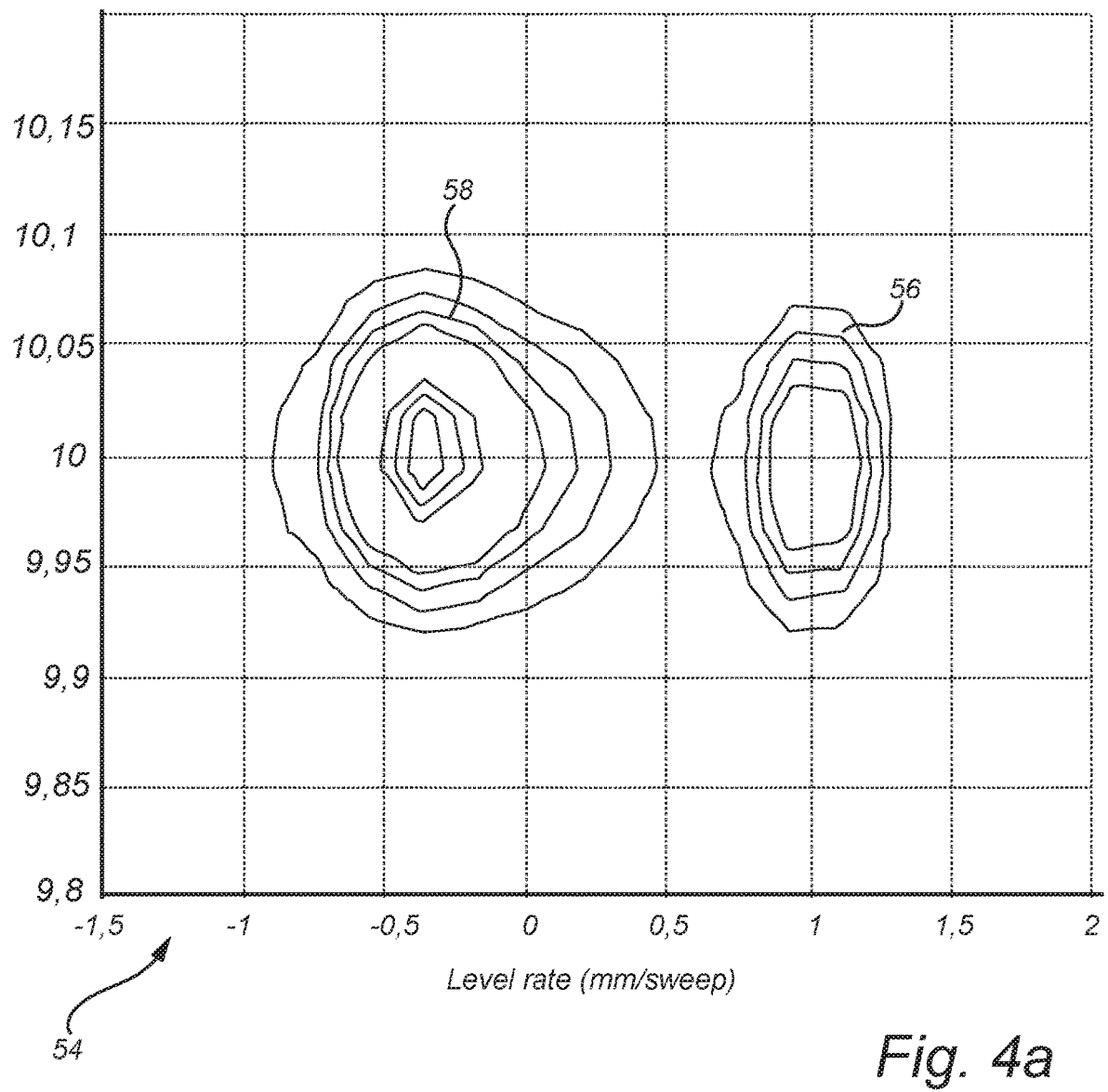
FIG. 4a shows a distance-level rate matrix according to an embodiment of the present invention.
Figure 4B:
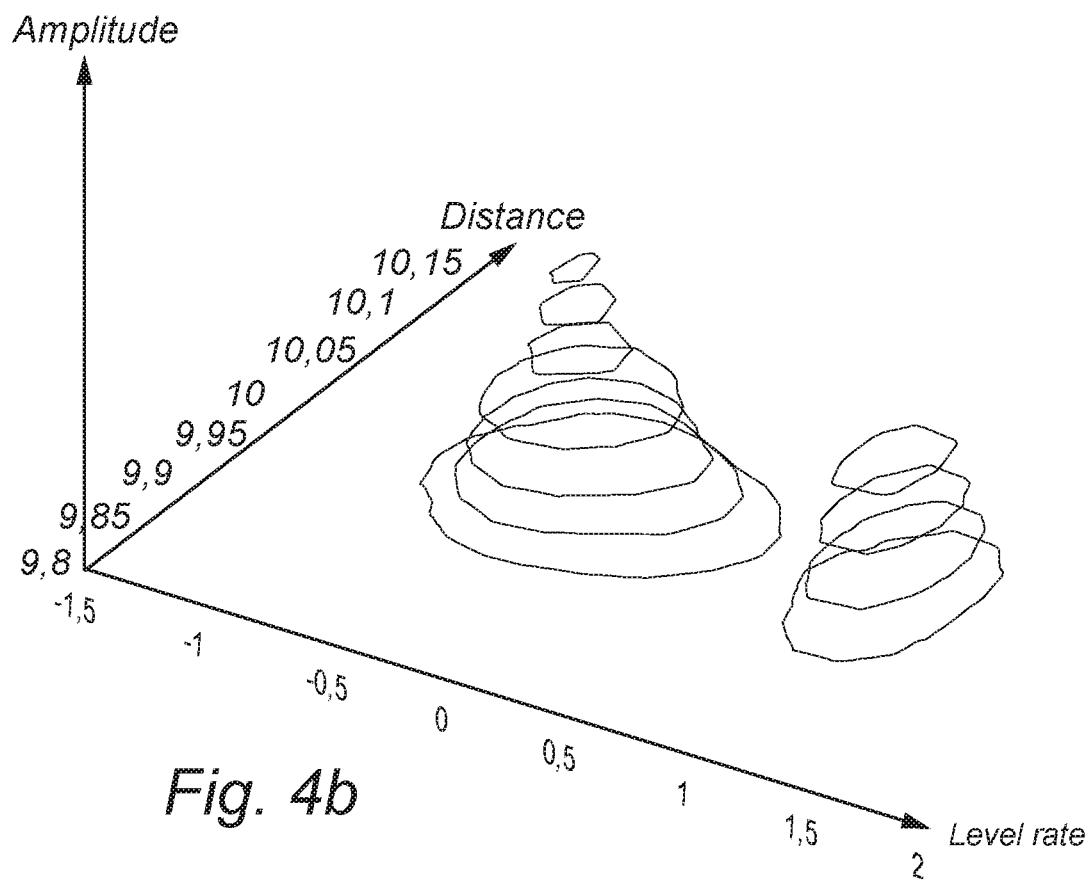
FIG. 4b is a 3D representation showing the distance-level rate matrix of FIG. 4a and amplitude.
Figure 4C:
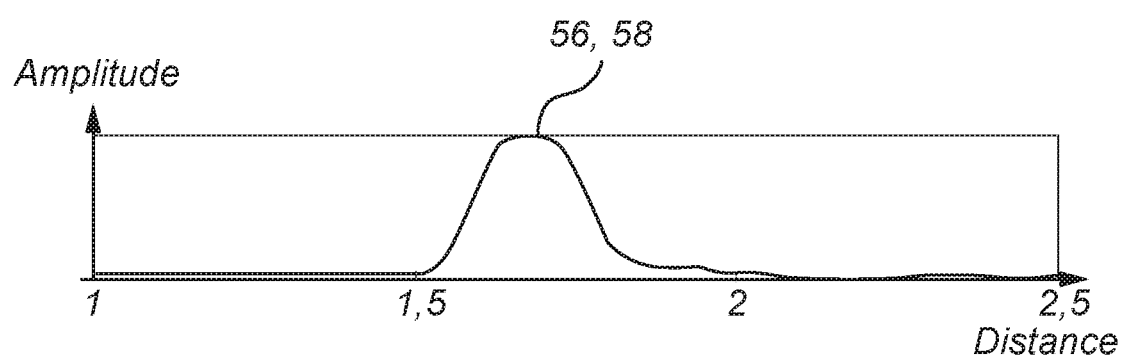
FIG. 4c shows a spectrum according to prior art.

Hence, for example in case the surface 12 is moving (typically up or down), and e.g. the disturbance 46 is stationary (or has a different level rate than the moving surface 12), the processing circuitry 22 in applying the range Doppler algorithm resolves the moving surface's echo 56 and disturbance's echo 58. In FIGS. 4a-b, both echoes are at the same distance of about 10 meters, but they are nevertheless resolved as two separate echoes 56 and 58. The processing circuitry 22 may hence determine the distance D to the surface 12 based on the echo 56. FIGS. 4a-b show the situation at a specific frequency sweep 50 of the plurality of frequency sweeps 50, and the distance-level rate matrix 54 as shown in FIGS. 4a-b may for example be based on 32 (N in FIG. 3b) preceding frequency sweeps 50. Furthermore in FIGS. 4a-b, the moving surface's echo 56 has a level rate of 1 mm/sweep, and disturbance's echo 58 has a level rate of −0.3 mm/sweep. For comparison, FIG. 4c shows a similar situation but without the range Doppler algorithm, whereby the echoes 56, 58 are not resolved (separated).

Figure 5A:
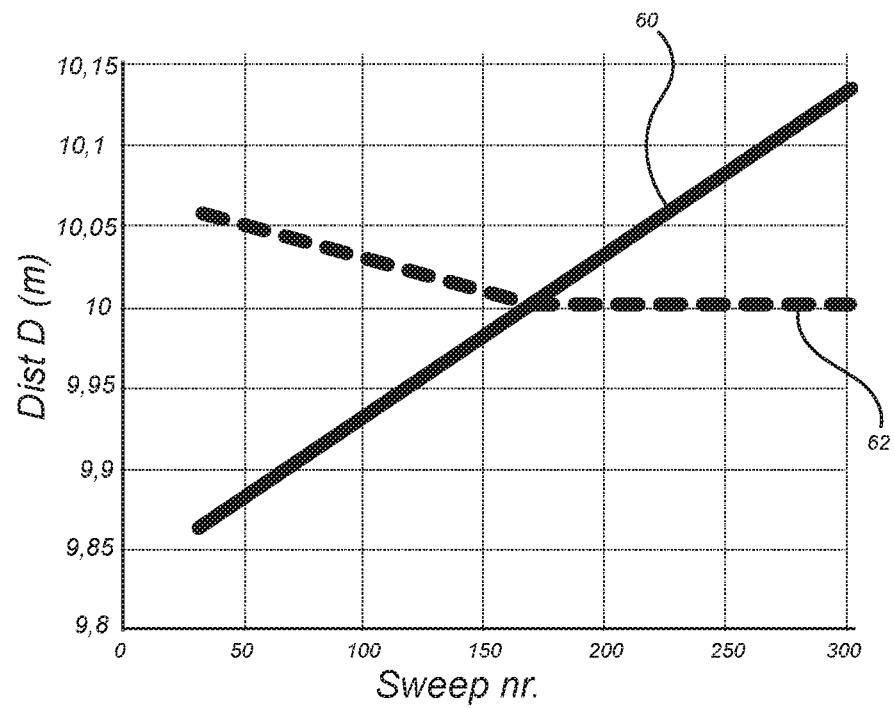
FIG. 5a is a plot of distances over time according to an embodiment of the present invention.
Figure 5B:
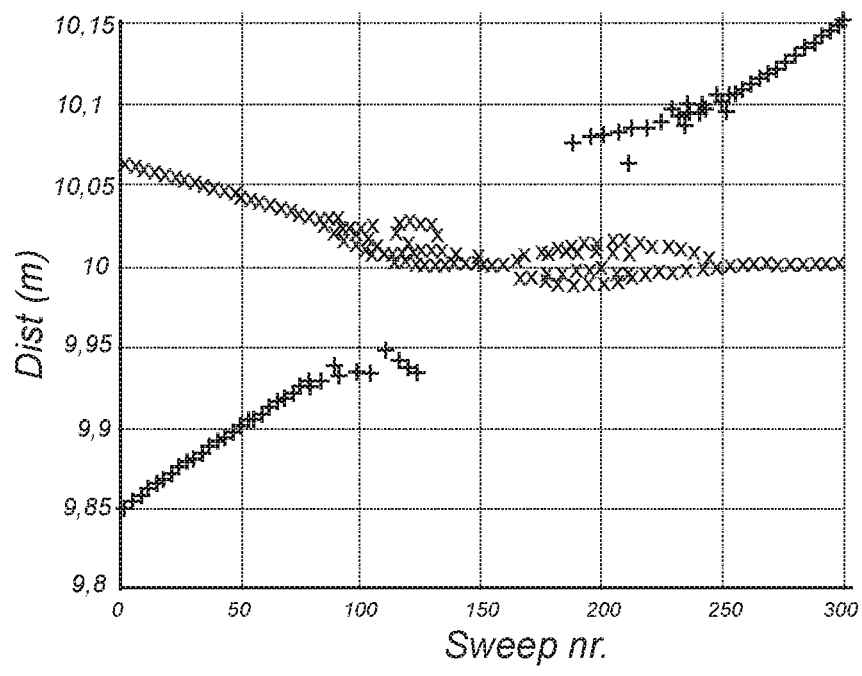
FIG. 5b is a plot of distances over time according to prior art.

In a specific example illustrated in FIG. 5a, the surface 12 is moving as the product 14 is being emptied from the tank 16. The echoes of the surface 12 at different frequency sweeps as determined by the processing circuitry 22 are plotted and indicated by a solid line 60, and the echoes of the disturbance 46 (stationary) at different frequency sweeps as determined by the processing circuitry 22 are plotted and indicated by a dotted line 62. As seen in FIG. 5a, the processing circuitry 22 in applying the range Doppler algorithm resolves the moving surface's echo and the disturbance's echo also while the moving surface 12 passes the disturbance 46. On the other hand, without the range Doppler algorithm the surface's echo may not be resolved, and the determination of the distance to the surface may be lost while the moving surface passes the disturbance, as illustrated in FIG. 5b wherein the surface's echoes are indicated by + and the disturbance's echoes are indicated by x.

It can also be noted for example in FIG. 5a that even if the disturbance 46 is stationary, it "moves" in the opposite direction compared to the surface 12, when the disturbance 46 is below the moving surface 12 and hence submerged in the product 14. This is illustrated by the inclined portion of the dotted line 32 to the left of the intersection with the solid line 60 in FIG. 5a. It is also illustrated by the negative level rate of the disturbance's echo 58 in FIGS. 4a-b. The reason for this perceived movement of the disturbance 46 is that the speed of the signals $S_T$ and $S_R$ depends on the medium.

Figure 6:
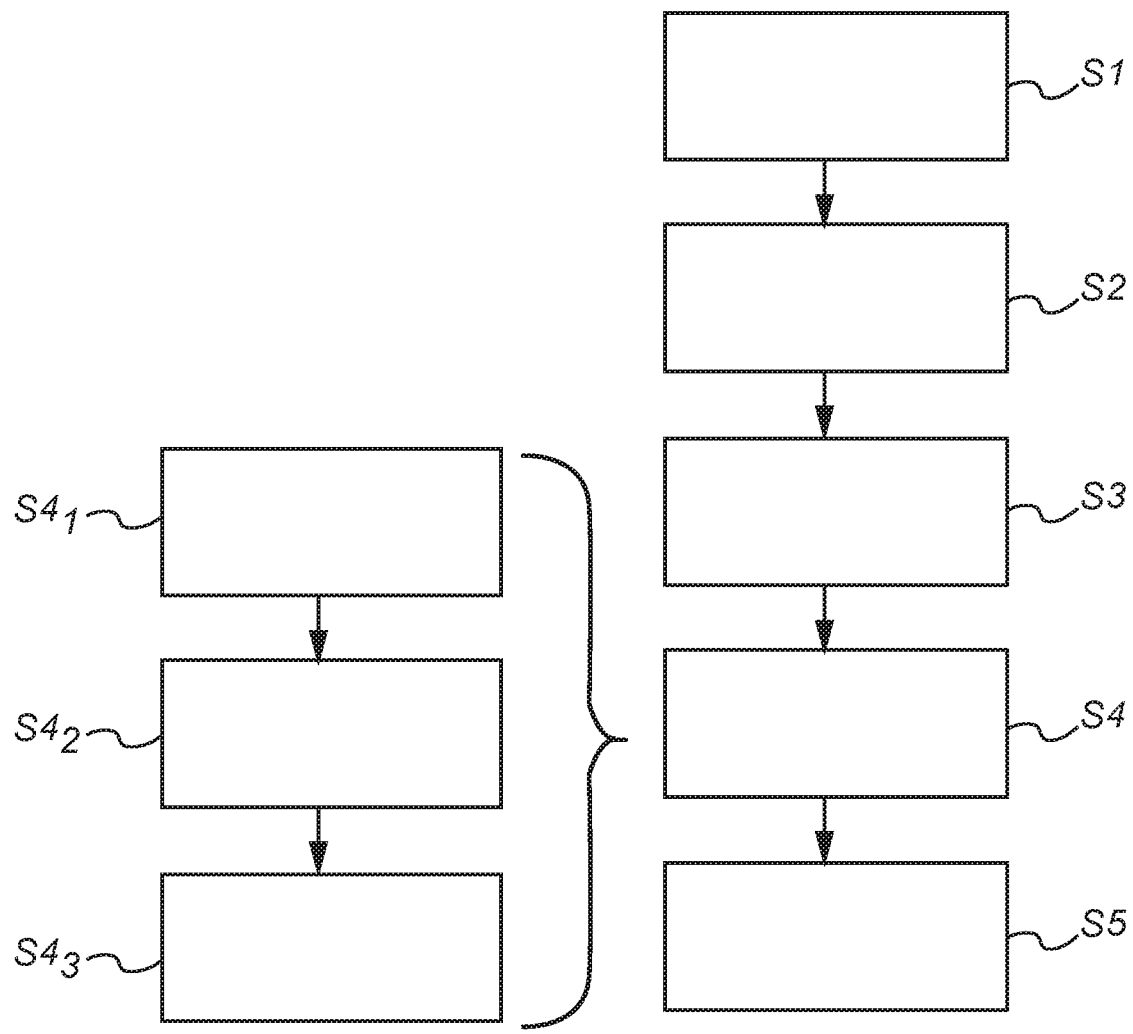
FIG. 6 is a flow chart of a method according to an embodiment of the present invention.

FIG. 6 is a flow chart of a method according to an embodiment of the present invention. The method may be performed by the radar level gauge 10. That is, the steps of the method may be carried out during operation of the radar level gauge 10. The method comprises: transmitting (S1) an electromagnetic transmit signal $S_T$ with varying frequency towards the surface 12, receiving (S2) an electromagnetic return signal $S_R$, mixing (S3) the transmitted electromagnetic transmit signal $S_T$ with the received electromagnetic return signal $S_R$ to provide an output signal including information about the surface's echo 56 and information about another echo 58, applying (S4) an algorithm to the output signal, which algorithm provides the distance-level rate matrix 54 wherein the surface's echo 56 and the another echo 58 each is determined in the two dimensions distance and level rate, and determining (S5) the distance D to the surface 12 based on the thus determined echo 56 of the surface 12. Applying the algorithm to the output signal may comprise: performing (S41) a first Fast Fourier Transform $FFT_1$ on the output signal for each frequency sweep 50 of the plurality of frequency sweeps 50 of the electromagnetic transmit signal $S_R$; storing (S4$_2$) the resulting consecutive spectra in a distance-time matrix 51; and performing (S4$_3$) a second Fast Fourier Transform $FFT_2$ for each distance 52 in the distance-time matrix 51 giving the distance-level rate matrix 54 in which the surface's echo 56 and the another echo 58 each is determined in the two dimensions.

The person skilled in the art realizes that the present invention by no means is limited to the preferred embodiments described above. On the contrary, many modifications and variations are possible within the scope of the appended claims.

For example, more than two echoes may be resolved, e.g. the echo of the surface 12, the echo of the disturbance 46, and the echo of the bottom 48.

Furthermore, instead of two (1D) FFTs like in FIG. 3a, one 2D FFT could be performed. Furthermore, instead of FFT, DFT (discrete Fourier transform) or the Goertzel algorithm could be used, for example.

Furthermore, instead of adding the delay $T_{delay}$, the total time $T_f$ may be extended by adding more frequency sweeps to an electromagnetic transmit signal $S_T$ where the frequency sweeps occur immediately after each other, for example 64 frequency sweeps instead of 32, and then only perform $FFT_1$ on some of the frequency sweeps, for example every other frequency sweep.

What is claimed is:

1. A radar level gauge for determining a distance to a surface of a product in a tank, said radar level gauge comprising:
   a transceiver configured to transmit an electromagnetic transmit signal with varying frequency towards said surface and to receive an electromagnetic return signal, via a signal propagation device;
   a mixer adapted to mix the transmitted electromagnetic transmit signal with the received electromagnetic return signal to provide a mixer output signal including information about the surface's echo and information about another echo; and
   processing circuitry configured to apply an algorithm to the mixer output signal, which algorithm provides a distance-level rate matrix wherein the surface's echo and said another echo each is determined in two dimensions, wherein the two dimensions are distance and level rate, and to determine the distance to the surface based on the thus determined echo of the surface.

2. A radar level gauge according to claim 1, wherein said surface is moving, wherein said another echo comes from an element in or of said tank, which element is stationary or moving at a different level rate than the moving surface, and wherein the processing circuitry in applying the algorithm is configured to resolve the moving surface's echo and said element's echo.

3. A radar level gauge according to claim 2, wherein said element is a disturbance in said tank, and wherein the processing circuitry in applying the algorithm is configured to resolve the moving surface's echo and the disturbance's echo while the moving surface passes the disturbance in said tank.

4. A radar level gauge according to claim 2, wherein said element is the bottom of said tank.

5. A radar level gauge according to claim 1, wherein the electromagnetic transmit signal comprises a plurality of frequency sweeps.

6. A radar level gauge according to claim 5, wherein there is a delay after each frequency sweep of said plurality of frequency sweeps.

7. A radar level gauge according to claim 5, wherein the processing circuitry is configured to apply the algorithm to the mixer output signal by:
   performing a first Fast Fourier Transform on the mixer output signal for each of at least some frequency sweeps of the plurality of frequency sweeps of the electromagnetic transmit signal;
   storing the resulting spectra in a distance-time matrix; and performing a second Fast Fourier Transform for each distance in the distance-time matrix giving the distance-level rate matrix in which the surface's echo and said another echo each is determined in the two dimensions.

8. A radar level gauge according to claim 1, wherein the algorithm is a range Doppler algorithm.

9. A radar level gauge according to claim 1, wherein the radar level gauge is a Frequency Modulated Continuous Wave radar level gauge.

10. A method of determining a distance to a surface of a product in a tank, which method comprises:
   transmitting an electromagnetic transmit signal with varying frequency towards said surface;
   receiving an electromagnetic return signal;
   mixing the transmitted electromagnetic transmit signal with the received electromagnetic return signal to provide an output signal including information about the surface's echo and information about another echo;
   applying an algorithm to the output signal, which algorithm provides a distance-level rate matrix wherein the surface's echo and said another echo each is determined in two dimensions, wherein the two dimensions are distance and level rate; and
   determining the distance to the surface based on the thus determined echo of the surface.

11. A method according to claim 10, wherein said surface is moving, wherein said another echo comes from an element in or of said tank, which element is stationary or moving at a different level rate than the moving surface, and wherein applying the algorithm includes resolving the moving surface's echo and said element's echo.

12. A method according to claim 11, wherein said element is a disturbance in said tank, and wherein applying the algorithm includes resolving the moving surface's echo and the disturbance's echo while the moving surface passes the disturbance in said tank.

13. A method according to claim 11, wherein said element is the bottom of said tank.

14. A method according to claim 10, wherein the electromagnetic transmit signal comprises a plurality of frequency sweeps.

15. A method according to claim 14, wherein there is a delay after each frequency sweep of said plurality of frequency sweeps.

16. A method according to claim 14, wherein applying the algorithm to the output signal comprises:
   performing a first Fast Fourier Transform on the output signal for each of at least some frequency sweeps of the plurality of frequency sweeps of the electromagnetic transmit signal;
   storing the resulting spectra in a distance-time matrix; and
   performing a second Fast Fourier Transform for each distance in the distance-time matrix giving the distance-level rate matrix in which the surface's echo and said another echo each is determined in the two dimensions.

17. A method according to claim 10, wherein the algorithm is a range Doppler algorithm.

18. A non-transitory computer program product comprising computer program code to perform, when executed on a computer, the steps of:
   applying an algorithm to an output signal, which output signal is provided by mixing an electromagnetic transmit signal transmitted towards a surface of a product in a tank with a received electromagnetic return signal, wherein the output signal includes information about the surface's echo and information about another echo, wherein the algorithm provides a distance-level rate matrix wherein the surface's echo and said another echo each is determined in two dimensions, wherein the two dimensions are distance and level rate; and
   determining the distance to the surface based on the thus determined echo of the surface.

* * * * *